United States Patent
Liao et al.

(10) Patent No.: US 11,543,304 B2
(45) Date of Patent: Jan. 3, 2023

(54) TEMPERATURE MEASUREMENT SYSTEM AND TEMPERATURE MEASUREMENT DEVICE

(71) Applicant: Goldtek Technology Co., Ltd., New Taipei (TW)

(72) Inventors: Kuan-Ting Liao, New Taipei (TW); Chih-Feng Liou, New Taipei (TW); Kuo-Lin Chien, New Taipei (TW); Huang-Lin Chen, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 833 days.

(21) Appl. No.: 16/445,350

(22) Filed: Jun. 19, 2019

(65) Prior Publication Data

US 2020/0237019 A1 Jul. 30, 2020

(51) Int. Cl.
*G01K 13/00* (2021.01)
*G01K 7/00* (2006.01)

(52) U.S. Cl.
CPC .............. *G01K 13/00* (2013.01); *G01K 7/00* (2013.01); *G01K 2217/00* (2013.01)

(58) Field of Classification Search
CPC ...... G01K 13/00; G01K 13/02; G01K 13/024; G01K 2213/00; G01K 2217/00; G01K 3/06; G01K 7/00; G01K 15/005; A24F 40/80; A24F 40/50; A24F 40/51; A24F 40/57; A24F 40/10; A24F 40/53; A24F 40/485; A24F 40/40; A24F 47/00; A24F 40/60; A24F 40/465; H05B 1/0244; H05B 3/12; H05B 3/20; H05B 3/48; H05B 1/0297; H05B 2203/021; H05B 1/0227; H05B 3/44; H05B 1/02; A24D 1/20; A24D 1/02; G01F 1/6888; G01F 1/6842
See application file for complete search history.

(56) References Cited

U.S. PATENT DOCUMENTS

| | | | | |
|---|---|---|---|---|
| 5,218,834 A | * | 6/1993 | Major | F25B 45/00 374/E11.018 |
| 9,247,773 B2 | * | 2/2016 | Memari | H02J 7/35 |
| 9,414,629 B2 | * | 8/2016 | Egoyants | A24F 40/485 |
| 9,635,886 B2 | * | 5/2017 | Tu | A24F 40/51 |
| 11,039,644 B2 | * | 6/2021 | Paprocki | A24F 40/485 |
| 2019/0166914 A1 | * | 6/2019 | Qiu | A24F 40/40 |

FOREIGN PATENT DOCUMENTS

GB 2523731 A * 9/2015 ............... G01K 1/08

* cited by examiner

*Primary Examiner* — Vinh P Nguyen
(74) *Attorney, Agent, or Firm* — ScienBiziP, P.C.

(57) ABSTRACT

A temperature measurement system for determining a performance of a smoke generating device includes a temperature measuring device. The temperature measuring device includes an elongated carrier and a number of thermal sensors disposed within the elongated carrier. The elongated carrier is configured to be inserted into an elongated chamber of the smoke generating device. Each of the thermal sensors includes a sensing end exposed on an outer surface of the elongated carrier. When the elongated carrier is inserted into the elongated chamber, the sensing ends respectively detect a temperature of a number of heating members of the smoke generating device.

15 Claims, 10 Drawing Sheets

TEMPERATURE MEASUREMENT SYSTEM AND TEMPERATURE MEASUREMENT DEVICE

FIELD

The subject matter herein generally relates to a temperature measurement system for determining a performance of an electronic cigarette.

BACKGROUND

Generally, when a cigarette burns at 500° C. to 900° C., harmful substances are generated. Electronic smoke generating devices, such as electronic cigarettes, can use an electronic heating module to directly heat a source of smoke, such as a cigarette, to produce smoke. In some cases, the electronic heating module is configured to maintain the temperature at a desired temperature range sufficient to prevent the source of the smoke from producing harmful substances.

To measure a performance of the electronic heating module, the electronic heating module is used to heat the cigarette, and a degree of carbonization of the cigarette is visually observed to determine the performance of the electronic heating module. However, using cigarettes to determine the performance may cause air pollution. In addition, the measurement process involves human observation, which makes the measurement results vary from person to person.

BRIEF DESCRIPTION OF THE DRAWINGS

Embodiments of the present disclosure will now be described, by way of embodiments, with reference to the attached figures.

DETAILED DESCRIPTION

Figure 1:
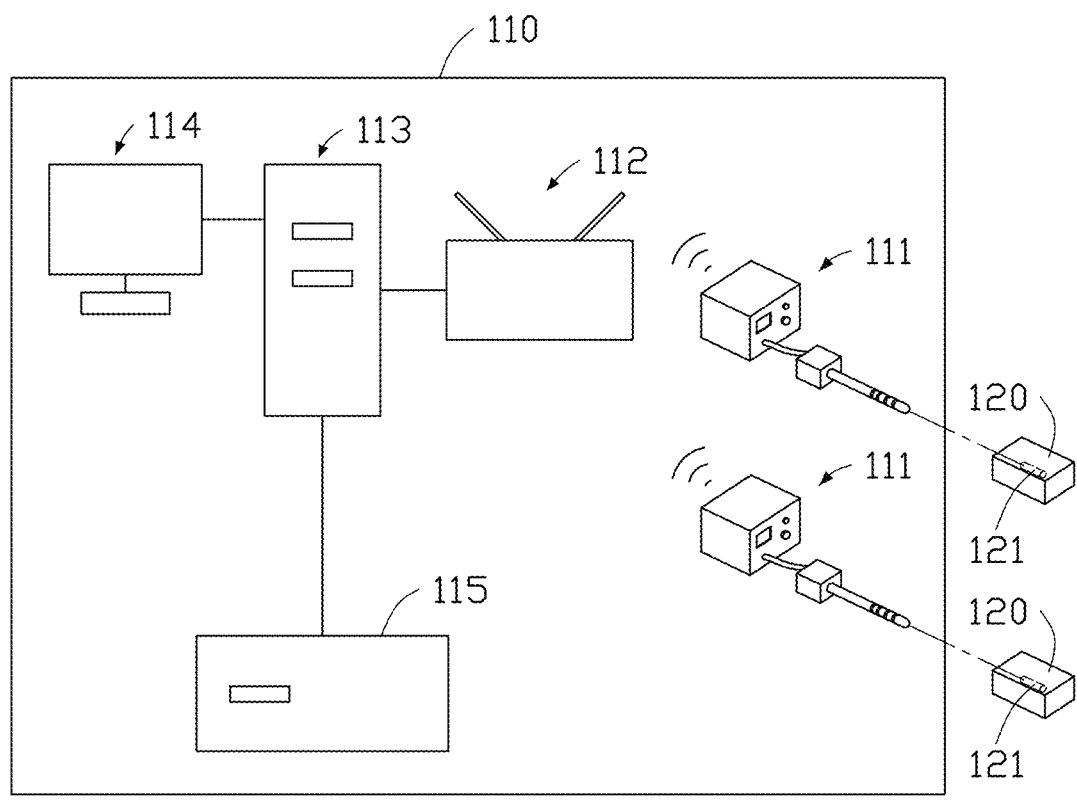
FIG. 1 is a diagram of an embodiment of a temperature measurement system 110.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows a diagram of an embodiment of a temperature measurement system 110 for determining a performance of a smoke generating device 120. The temperature measurement system 110 includes a temperature measuring device 111, a router 112, a processing unit 113, a display unit 114, and a storage unit 115. The smoke generating device 120 may be an electronic cigarette. FIG. 1 shows two smoke generating devices 120 and two temperature measuring devices 111, but the embodiment is not limited to two. Each smoke generating device 120 defines an elongated chamber 121 for one corresponding temperature measuring device 111 to be inserted. When the two temperature measuring devices 111 are respectively inserted into the two smoke generating devices 120, the temperature measuring devices 111 detect a temperature of a heating member (shown in FIG. 4) of the smoke generating device 120, and the detected temperature is digitized and transmitted to the processing unit 113 through the router 112. In other embodiments, the detected temperature collected by the temperature measuring device 111 may be digitized and transmitted to the processing unit 113 through a wired connection, thereby omitting the router 11. In other embodiments, the processing unit 113 and the storage unit 115 may be an integrated hardware component.

In one embodiment, the processing unit 113 is a server. The processing unit 113 is configured to determine whether the temperature of each heating member is in a plurality of predetermined temperature intervals at a plurality of time points according to the digitized detected temperatures, so as to determine a performance of the heating member, and store a determination result in the storage unit 115. In other embodiments, the processing unit 53 is configured to determine whether the temperature of each heating member is within a predetermined temperature interval at a point in time based on the digitized detected temperature. It should be noted that, in order to obtain a better user experience, the temperature of the heating member of the smoke generating device 120 is a smooth curve with respect to time. Therefore, by determining the temperature at a plurality of time points, whether the change in temperature with respect to time conforms to a smooth curve is determined, thereby determining the performance of the heating member.

The display unit 114 is configured to display the determination result of the processing unit 113. In one embodiment, the display unit 114 includes a display screen.

In one embodiment, the storage unit 115 is an FTP server.

Figure 2A:
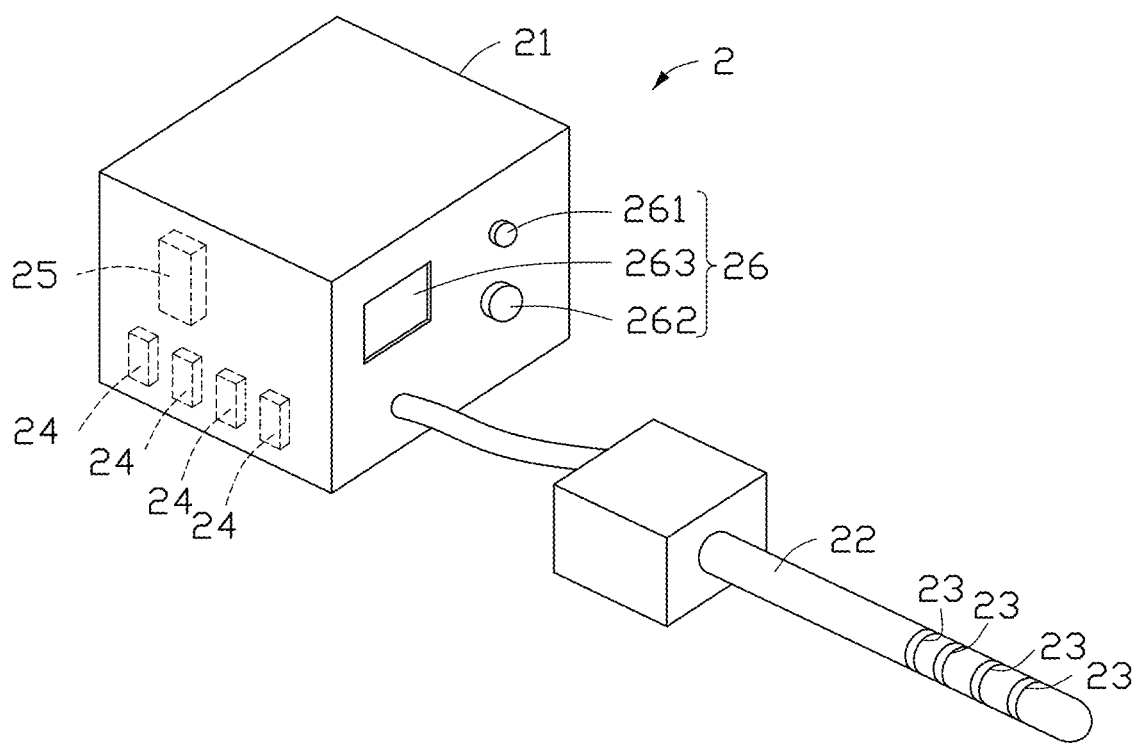
FIG. 2A is a schematic structural view of an embodiment of a temperature measuring device of the temperature measurement system.
Figure 2B:
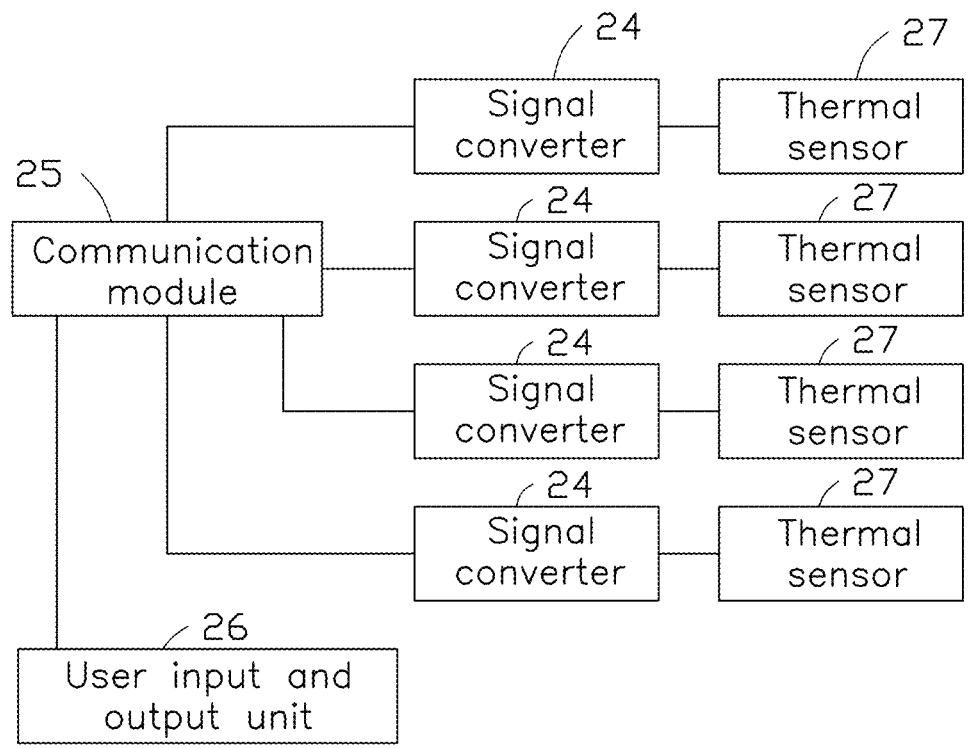
FIG. 2B is a schematic block diagram of the temperature measuring device in FIG. 2A.

FIGS. 2A and 2B show a schematic structural view of an embodiment of a temperature measuring device 2. The temperature measuring device 2 corresponds in structure to the temperature measuring device 111 in FIG. 1.

In one embodiment, the temperature measuring device 2 includes an assembly box 21, a long carrier 22 configured to insert into the elongated chamber 121, four thermal sensors 27 (shown in FIG. 2B) disposed on the elongated carrier 22 and configured to detect the temperatures, four thermal pads 23 attached to an outer surface of the elongated carrier 22, four signal converters 24 located on the assembly box 21, a communication module 25 located in the assembly box 21, and a user input and output unit 26 located on the assembly box 21. A quantity of the thermal sensors 27, the thermal pads 23, and the signal converters 24 is not limited to this embodiment and may be changed according to actual needs.

The four signal converters 24 are electrically coupled to the four thermal sensors 27, respectively, and are configured to digitize the detected temperatures from the thermal sensors 27. In one embodiment, the signal converter 24 is a MAX6675 signal converter. In other embodiments, the signal converter 24 can be a MAX31855 signal converter.

The communication module 25 is coupled to the signal converters 24 and the processing unit 113 and is configured to transmit the digitized detected temperatures from the signal converter 24 to the processing unit 113. The processing unit 113 is communicatively coupled to the signal converters 24 by the communication module 25. In one embodiment, the communication module 25 includes a WIFI communication circuit ESP8266.

The user input and output unit 26 is communicatively coupled to the communication module 25 and is configured to generate an indication output indicating an operational status of the communication module 25, and is further configured to be manually operated to switch a connection status of the communication module 25. In one embodiment, the user input and output unit 26 includes a switch 261 for user operation, a light-emitting diode module 262, and a display screen 263. The switch 261 contains a button. When the button is operated, the connection status of the communication module 25 switches between a connected status and an unconnected status. In one embodiment, when the connection status of the communication module 25 is in the connected status, the LED module 262 emits green light, and the display screen 263 displays the word "connected".

Figure 3:
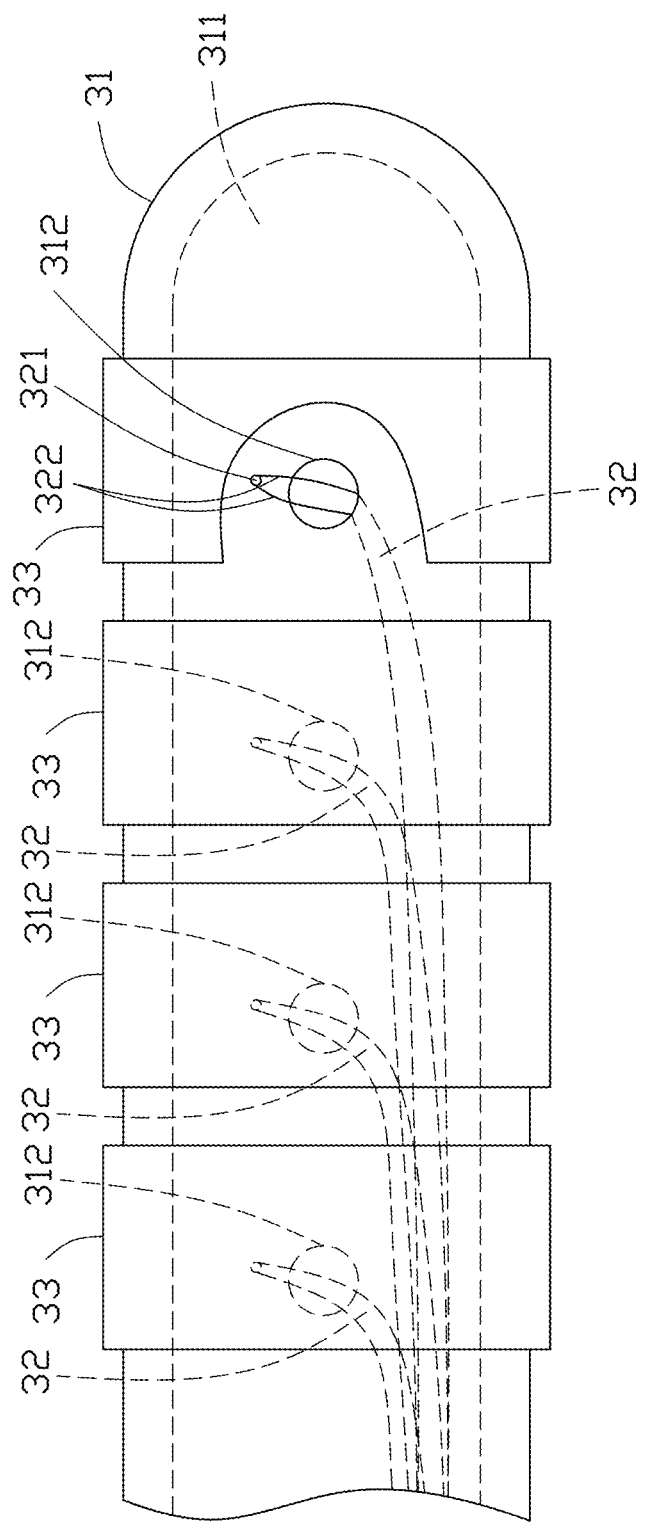
FIG. 3 is a schematic structural view of an embodiment of an elongated carrier of the temperature measuring device.

FIG. 3 shows a schematic structural view of an embodiment of an elongated carrier 31, a plurality of thermal sensors 32, and a plurality of thermal pads 33. The elongated carrier 31, the plurality of thermal sensors 32, and the plurality of thermal pads 33 may respectively correspond to the elongated carrier 22, the thermal sensors 27, and the thermal pads 23 in FIGS. 2A and 2B. The elongated carrier 31 is configured to be inserted into an elongated chamber (such as the elongated chamber 121). The elongated carrier 31 defines a cavity 311 and a plurality of through holes 312 communicating with the cavity 311. In one embodiment, the through holes 312 are arranged along a longitudinal direction of the elongated carrier 31. In other embodiments, the through holes 312 may be spirally distributed on an outer surface of the elongated carrier 31.

The thermal sensors 32 are disposed on the elongated carrier 31 and each includes a sensing end 321 and two wires 322. In one embodiment, the sensing end 321 is formed by splicing the two wires 322. The sensing ends 321 are exposed on the outer surface of the elongated carrier 31 through the respective through holes 312 and are spaced apart from each other along the longitudinal direction of the elongated carrier 31. In one embodiment, the thermal sensor is a temperature measuring line. Specifically, the thermal sensor is a Type-K thermocouple. In other embodiments, the thermal sensor may be a resistance temperature detector or a thermistor having an appropriate signal conversion module to achieve temperature measurement. In one embodiment, the sensing ends 321 of the thermal sensors 32 are exposed and fixed to the outer surface of the elongated carrier 31 by a heat-conductive adhesive tape (not shown).

Four heat conducting sheets 33 are attached around the outer surface of the elongated carrier 31 and are spaced apart from each other along the longitudinal direction of the elongated carrier 31 and respectively cover the sensing ends 321. In one embodiment, the thermal pad 33 is a copper foil. In other embodiments, the thermal pad 33 may be made of a material having good heat conductivity (e.g., a heat transfer coefficient greater than 400 W/mK). In FIG. 3, a portion of a rightmost thermal pad 33 is removed to illustrate a structure shielded by the thermal pad 33. Each thermal pad 33 conducts heat of a heating member in the smoke generating device 120 to the sensing end 321 of the respective thermal sensor 32.

Figure 4:
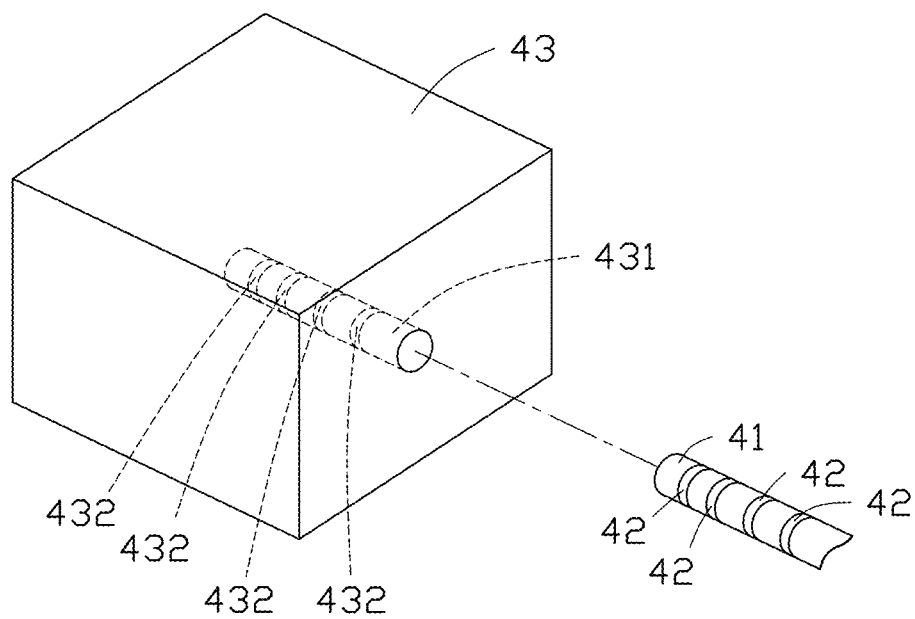
FIG. 4 is a schematic structural view of an embodiment of an elongated carrier 41 and a smoke generating device.

FIG. 4 shows a schematic structural view of an embodiment of an elongated carrier 41 and a smoke generating device 43. The elongated carrier 41 may correspond in structure to the elongated carrier 31 in FIG. 3, and the smoke generating device 43 may correspond in structure to the smoke generating device 120 in FIG. 1. The elongated carrier 41 includes four thermal pads 42. The smoke generating device 43 defines an elongated chamber 431 having four heating members 432 spaced apart from one another. The heating members 432 are used for heating a source of smoke generation (not shown) housed in the elongated chamber 431. The source of smoke generation may be an electronic cigarette. A shape of the elongated carrier 41 matches a shape of the elongated chamber 431. A spacing of the thermal pads 42 matches a spacing of the heating members 432. Four thermal sensors (not shown) are located within the elongated carrier 41, and each thermal sensor includes a sensing end (not shown) covered by the corresponding thermal pad 42.

When the elongated carrier 41 is inserted into the elongated chamber 431, the sensing ends of the four thermal sensors respectively detect a temperature of the four heating members 432.

Figure 5:
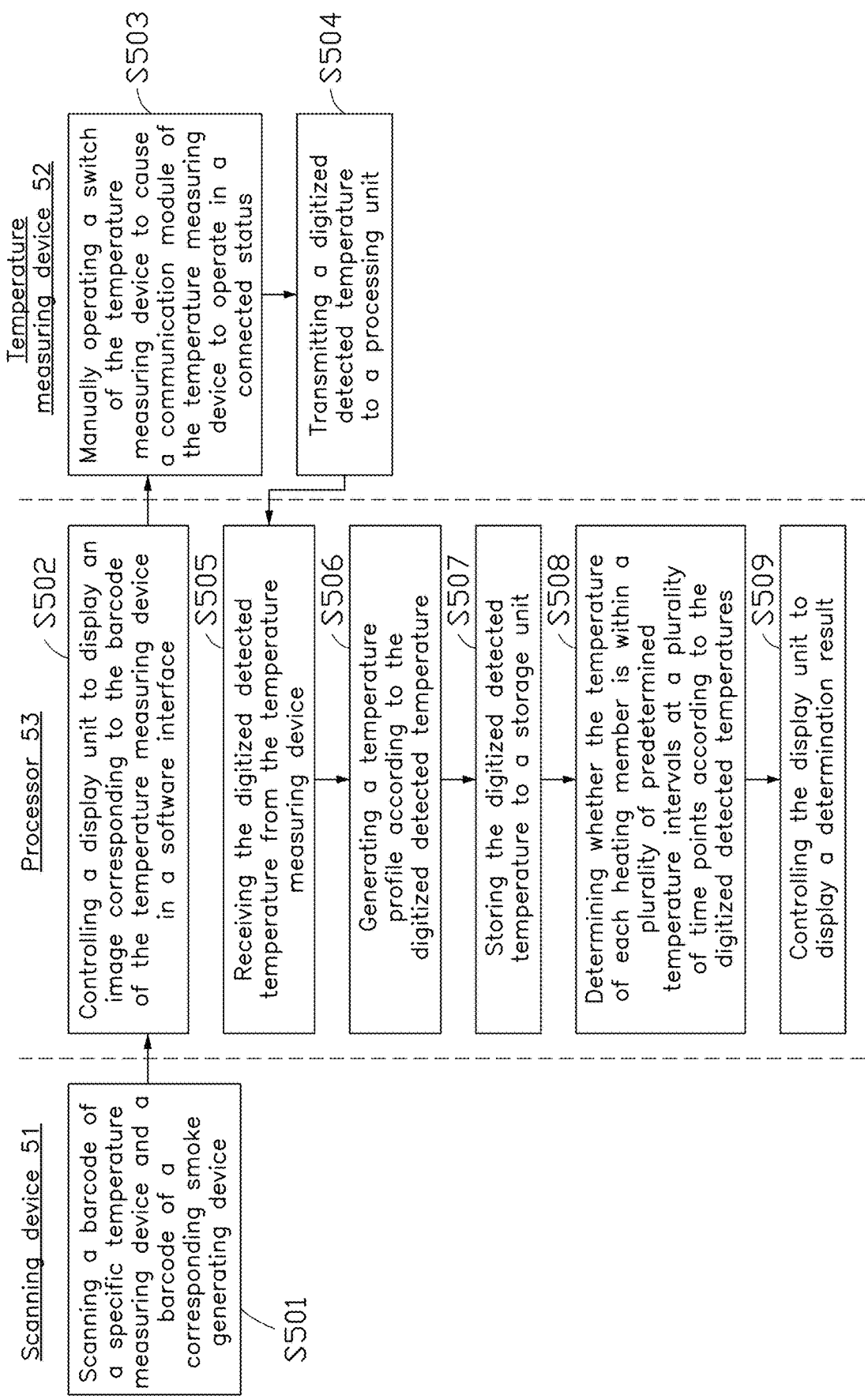
FIG. 5 is a flowchart of an embodiment of a temperature sensing method.

FIG. 5 illustrates a flowchart of a temperature sensing method. The method is provided by way of embodiment, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S501, a scanning device scans a barcode of a specific temperature measuring device and a barcode of a corresponding smoke generating device. The scanning device can be a BLUETOOTH scanner.

At block S502, a processing unit controls a display unit to display an image corresponding to the barcode of the temperature measuring device in a software interface in an orange color according to the barcode scanned by the scanning device. In one embodiment, the image corresponding to the barcode is displayed in an orange color.

Figure 6:
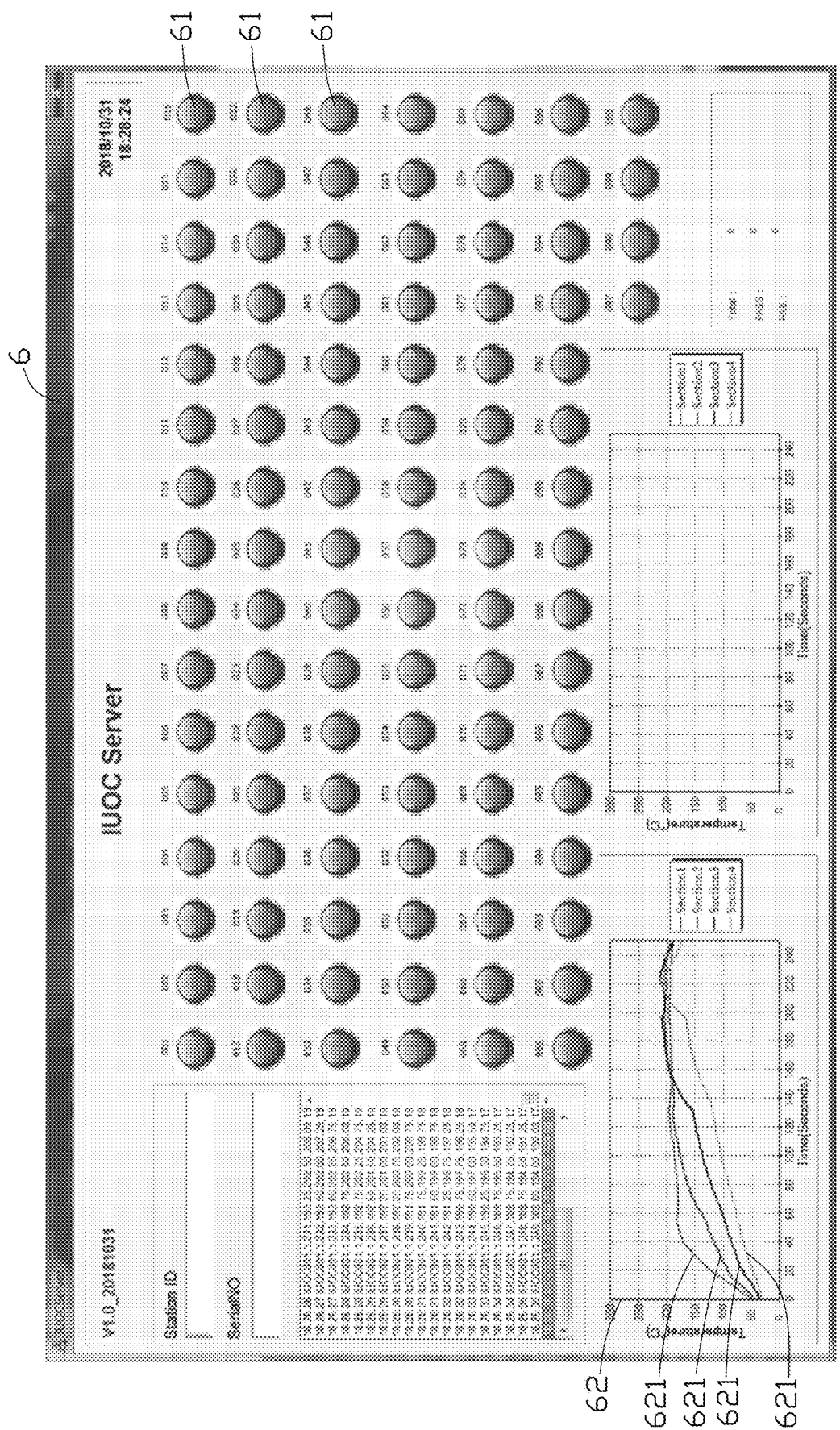
FIG. 6 is a diagram of an embodiment of a software interface.

FIG. 6 illustrates an exemplary software interface 6. The software interface 6 includes a plurality of images 61 respectively corresponding to a plurality of temperature measuring devices.

At block S503, a switch of the temperature measuring device is manually operated to cause a communication module of the temperature measuring device to operate in a connected status.

At block S504, the temperature measuring device transmits the digitized detected temperature to the processing unit. In one embodiment, heating is initiated at the smoke generating device, and the temperature measuring device is inserted into the smoke generating device.

At block S505, the processing unit receives the digitized detected temperature from the temperature measuring device.

At block S506, the processing unit generates a temperature profile according to the digitized detected temperature.

Referring to FIG. 6, a temperature profile 62 depicts four temperature versus time curves 621 corresponding to four heating members of the smoke generating device, respectively.

At block S507, the processing unit stores the digitized detected temperature to a storage unit.

At block S508, the processing unit determines whether the temperature of each heating member is within a plurality of predetermined temperature intervals at a plurality of time points according to the digitized detected temperatures. It should be noted that in order to obtain a better user experience, the temperature of the heating member of the smoke generating device is a smooth curve with respect to time. Therefore, by determining the temperature at a plurality of time points, whether the change in temperature with respect to time conforms to a smooth curve is determined, thereby determining the performance of the heating member.

Figure 7:
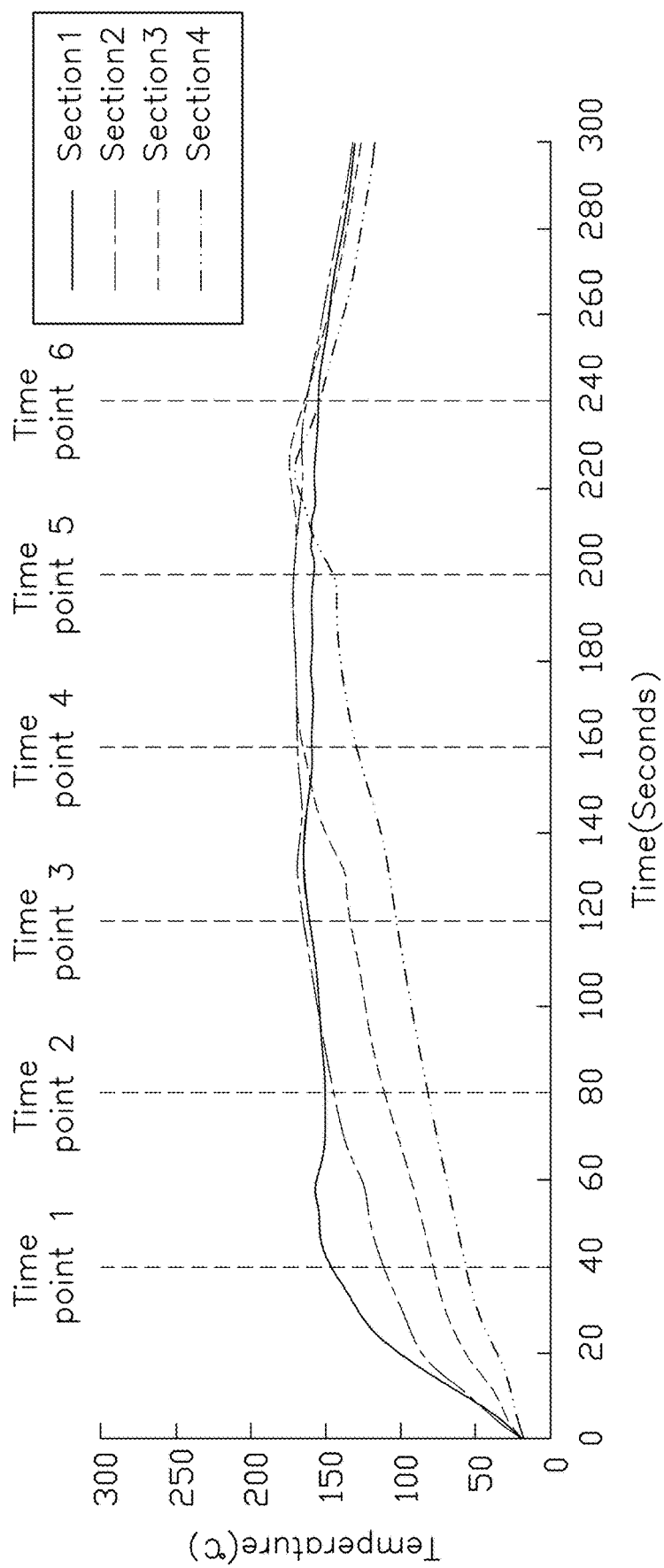
FIG. 7 is a graph of temperature versus time.

Referring to FIG. 7, the processing unit determines the temperature at 40 seconds (s), 80 s, 120 s, 160 s, 200 s, and 240 s. Taking the 40 s mark as an example, a condition of 140 to 160 degrees C. can be set as a predetermined temperature interval, and the processing unit determines the temperature of the corresponding heating member to be 150 degrees C. at the 40 s mark. Thus, it is determined that the corresponding heating member is within the corresponding predetermined temperature interval at the 40 second mark, and the condition is satisfied. Similarly, the processing unit can determine whether the temperature of the corresponding heating members are within the corresponding predetermined temperature interval at the 40 s, 80 s, 120 s, 160 s, 200 s, and 240 s marks.

At block S509, the processing unit controls the display unit to display the determination result. In some embodiments, for each heating member, if the determination result is YES, the image corresponding to the barcode (such as image 61) of the heating member in the software interface displayed by the display unit is green. Otherwise, the image is red. In one embodiment, when the processing unit determines that the temperatures of all the heating members are in the corresponding predetermined temperature ranges in the 40 s, 80 s, 120 s, 160 s, 200 s, and 240 s marks, the image of the barcode corresponding to the temperature measuring device in the software interface is green.

Figure 8A:
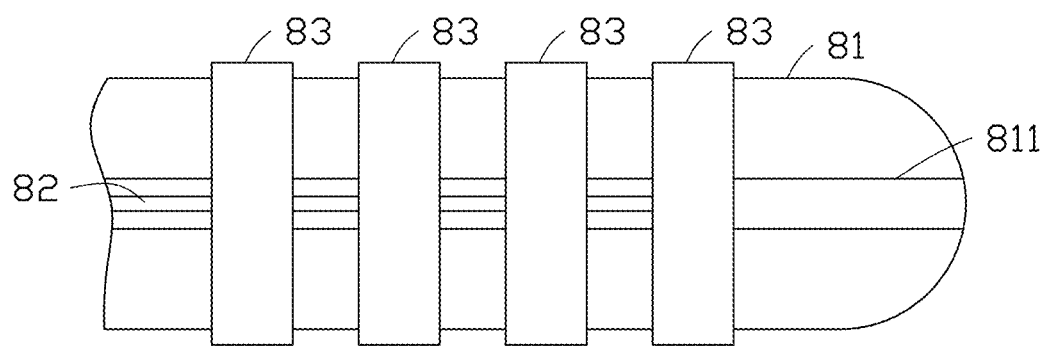
FIG. 8A is a front view of an embodiment of an elongated carrier.
Figure 8B:
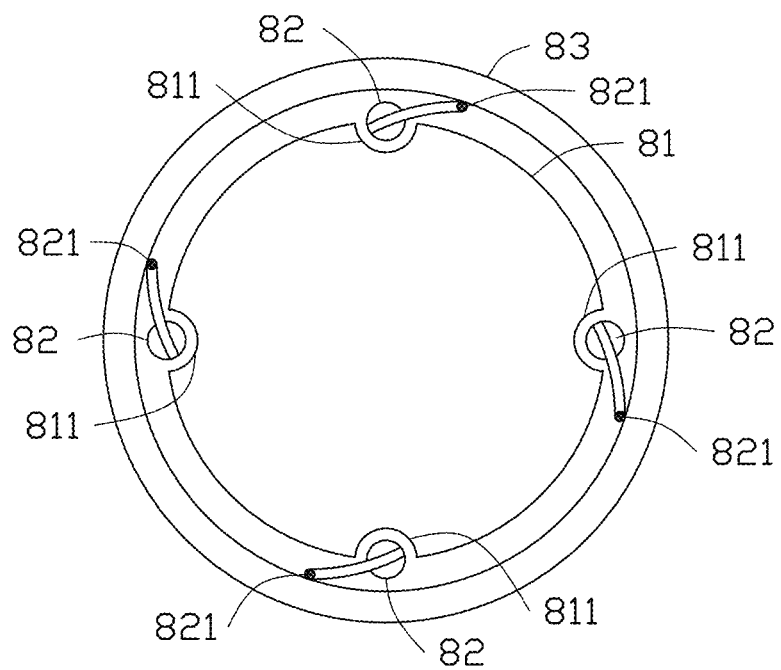
FIG. 8B is a right side view of FIG. 8A.

FIGS. 8A and 8B show a structural schematic diagram of another embodiment of an elongated carrier 81 including a plurality of thermal sensors 82 and a plurality of thermal pads 83. FIG. 8A is a front view and is similar to the angle of view of FIG. 3, and FIG. 8B is a right side view of FIG. 8A. Four thermal sensors 82 are respectively embedded in four elongated slots 811 defined in the elongated carrier 81, and a sensing end 821 of each thermal sensor 82 is covered by a corresponding thermal pad 83.

In summary, when the temperature measuring device is inserted into the elongated cavity, the sensing ends of the thermal sensors respectively correspond to the heating members of the smoke generating device, such that when the heating members are heated, the detected temperatures from the thermal sensors can be used to determine the performance of the heating members of the smoke generating device. In addition, the communication module can transmit the digitized detected temperatures to the processing unit through the wireless network and the router to determine the performance of the smoke generating device and can save the data to establish a record of performance.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A temperature measurement system for determining a performance of a smoke generating device, the temperature measurement system comprising:
   a temperature measuring device comprising:
      an elongated carrier configured to be inserted into an elongated chamber of the smoke generating device, the elongated carrier defines a cavity and a plurality of through holes communicating with the cavity; and
      a plurality of thermal sensors disposed within the elongated carrier; wherein:
   each of the plurality of thermal sensors comprises a sensing end exposed on an outer surface of the elongated carrier;
   the plurality of thermal sensors are received within the cavity and the sensing ends of the thermal sensors are exposed on the outer surface of the elongated carrier through respective through holes;
   when the elongated carrier is inserted into the elongated chamber, the sensing ends respectively detect a temperature of a plurality of heating members of the smoke generating device.

2. The temperature measurement system of claim 1, wherein:
   the plurality of through holes are spaced along a longitudinal direction of the elongated carrier; and
   the sensing ends of the plurality of thermal sensors are spaced apart along the longitudinal direction of the elongated carrier.

3. The temperature measurement system of claim 1, wherein:
   the sensing ends are fixed on the outer surface of the elongated carrier.

4. The temperature measurement system of claim 1, wherein:
   the temperature measuring device further comprises a plurality of thermal pads disposed on the outer surface of the elongated carrier;
   the plurality of thermal pads are spaced apart along a longitudinal direction of the elongated carrier and respectively cover the sensing ends of the thermal sensors.

5. The temperature measurement system of claim 1, wherein:

the temperature measuring device further comprises a plurality of signal converters respectively electrically coupled to the plurality of thermal sensors;

each of the plurality of signal converters is configured to digitize a temperature detected by the respective thermal sensor.

6. The temperature measurement system of claim 5 further comprising:

a processing unit configured to receive the digitized detected temperature from the plurality of thermal sensors and determine whether the temperature of each heating member at a predetermined time point is in a predetermined temperature interval.

7. The temperature measurement system of claim 6, wherein:

the processing unit is further configured to determine whether the temperature of each heating member at a plurality of time points is in a plurality of predetermined temperature intervals.

8. The temperature measurement system of claim 7 further comprising:

a display unit communicatively coupled to the processing unit and configured to display a determination result determined by the processing unit.

9. The temperature measurement system of claim 7 further comprising:

a communication unit communicatively coupled to the signal converters and the processing unit;

the communication unit is configured to transmit the digitized detected temperature from the signal converters to the processing unit.

10. A temperature measuring device configured to detect a temperature of a plurality of heating members of a smoke generating device, the temperature measuring device comprising:

an elongated carrier configured to be inserted into an elongated chamber of the smoke generating device, the elongated carrier defines a cavity and a plurality of through holes communicating with the cavity; and a plurality of thermal sensors disposed within the elongated carrier; wherein:

each of the plurality of thermal sensors comprises a sensing end exposed on an outer surface of the elongated carrier;

the plurality of thermal sensors are received within the cavity and the sensing ends of the thermal sensors are exposed on the outer surface of the elongated carrier through respective through holes;

when the elongated carrier is inserted into the elongated chamber, the sensing ends respectively detect a temperature of the plurality of heating members of the smoke generating device.

11. The temperature measuring device of claim 10, wherein:

the plurality of through holes are spaced along a longitudinal direction of the elongated carrier; and the sensing ends of the plurality of thermal sensors are spaced apart along the longitudinal direction of the elongated carrier.

12. The temperature measuring device of claim 11, wherein:

the sensing ends are fixed on the outer surface of the elongated carrier.

13. The temperature measuring device of claim 12, wherein:

the temperature measuring device further comprises a plurality of thermal pads disposed on the outer surface of the elongated carrier;

the plurality of thermal pads are spaced apart along a longitudinal direction of the elongated carrier and respectively cover the sensing ends of the thermal sensors.

14. The temperature measuring device of claim 13 further comprising a plurality of signal converters respectively electrically coupled to the plurality of thermal sensors, wherein:

each of the plurality of signal converters is configured to digitize a temperature detected by the respective thermal sensor.

15. The temperature measuring device of claim 14, wherein:

the plurality of thermal sensors are configured to transmit the digitized detected temperature from the plurality of thermal sensors to a processing unit.

* * * * *